United States Patent
Gefflaut et al.

(10) Patent No.: US 7,515,538 B2
(45) Date of Patent: Apr. 7, 2009

(54) PROBABILISTIC ESTIMATION OF ACHIEVABLE MAXIMUM THROUGHPUT FROM WIRELESS INTERFACE

(75) Inventors: Alain F. Gefflaut, Herzogenrath (DE); Petri Mähönen, Aachen (DE)

(73) Assignee: Microsoft Corporation, Redmond, WA (US)

( * ) Notice: Subject to any disclaimer, the term of this patent is extended or adjusted under 35 U.S.C. 154(b) by 585 days.

(21) Appl. No.: 11/249,583

(22) Filed: Oct. 13, 2005

(65) Prior Publication Data
US 2007/0086353 A1    Apr. 19, 2007

(51) Int. Cl.
*H04B 7/00* (2006.01)
*H04Q 7/28* (2006.01)

(52) U.S. Cl. .................... 370/232; 370/338
(58) Field of Classification Search ........... 370/352, 370/395.64
See application file for complete search history.

(56) References Cited

U.S. PATENT DOCUMENTS

| | | | |
|---|---|---|---|
| 7,039,038 B2 * | 5/2006 | Shoemake | 370/349 |
| 2003/0043773 A1 * | 3/2003 | Chang | 370/338 |
| 2004/0190511 A1 | 9/2004 | Muyaji et al. | 370/389 |
| 2005/0058049 A1 | 3/2005 | Shen | 369/59.22 |
| 2006/0135066 A1 * | 6/2006 | Banerjea | 455/41.2 |

FOREIGN PATENT DOCUMENTS

JP    2005-151600    6/2005

* cited by examiner

*Primary Examiner*—Chi H. Pham
*Assistant Examiner*—Soon D. Hyun
(74) *Attorney, Agent, or Firm*—Woodcock Washburn LLP

(57) ABSTRACT

A maximum achievable bit rate estimation for the expected bit rate between a wireless client and an access point is calculated in two phases. In the first phase, the maximum achievable bit rate is estimated using signal quality information and optionally congestion level information of the access point(s) of interest. In a second phase of the bit rate estimation, the first phase estimator output is corrected by using historical information relating the estimated bit rate values to the bit rates actually experienced. In the second phase of the estimation, a repository stores known signal quality behavior of the access points so as to provide an Access Point History (APH). The APH can be implemented as a simple memory (database) entity where a record is maintained on how accurate the previous bit-rate estimations turned out to be in practice. The actual physical embodiment of APH memory is implemented using any adequate memory technology such as FLASH, local hard disk, and the like. The APH is an ordered list where Access Point ID (SSID) and MAC address are combined with the data in an experimentally known relation between the SNR and the stable throughput. This two phase technique thus provides the implicit capability to include a rough bias to throughput estimation by congestion level of the access point as well as by historical bit rate averages.

19 Claims, 3 Drawing Sheets

PROBABILISTIC ESTIMATION OF ACHIEVABLE MAXIMUM THROUGHPUT FROM WIRELESS INTERFACE

FIELD OF THE INVENTION

The present invention relates to wireless access technologies and, more particularly, to a system and method of estimating the real achievable bit-rate of a wireless access point using historical data regarding the success of the bit-rate estimation combined with the identification of the access point using MAC (Medium Access Control) layer addresses.

BACKGROUND OF THE INVENTION

Currently, the number of different wireless access interfaces is increasing rapidly. Most notably, there are an increasing number of WiFi access points available as hotspots or belonging to corporate networks. Since the access to these networks needs to be automated, one of the tasks of the connection manager, which might be a part of an operating system environment, is to decide which of the available access points (or base-stations) should be used. While the invention is described in the context of WiFi (IEEE 802.11), those skilled in the art will appreciate that the same problem addressed herein may be present in connecting to other wireless networks as well.

In connecting to an access point, the end-user (application) is most often interested in achieving the maximum available bit-rate from the access point. Although WiFi access points advertise over their beacons the supported bit-rates, this information is not particularly useful because the beacons are sent over the low bit-rate, robust modulation scheme (1 Mbps) and hence can be heard over the larger distance range. In fact, beacons are received further away than the actual high-speed modulation schemes (e.g. 54 Mbps, 11 Mbps) can work reliably. Also, the final decision on the applicable bit-rate is typically after the connection is established, and decided based on the link-layer error rate. This means that the remote client (STA) must first associate to an access point (AP) and then try the highest possible bit-rate for communication. If the communication fails (e.g., too many un-received ACKs), the system tries the next lowest-level and so forth. This technique naturally increases latency and may actually lead to the initial selection of a sub-optimal access point.

Hence the information provided in beacons is purely informative and does not reflect in any way what the real download bandwidth will be for a wireless station. A simple method for wireless stations is desired whereby the achievable download bandwidth based on signal-to-noise (SNR) or SINR (signal-to-interference-noise) received from the most optimal access point may be statistically estimated. Such a statistical estimation will provide a better idea of the most probable bit-rate that can be achieved after the actual connection is built (and without waiting for the connection to be built).

However, those skilled in the art will appreciate that the value returned by such a technique will represent a best case estimation of the bandwidth, as the value does not take into account the possible collisions resulting from contention of multiple wireless stations at the physical layer. Accordingly, it is further desired to apply a correction factor to the computed bandwidth that is based on the historical memory of previous estimations in order to adjust the estimated bit-rate and thus come closer to a real estimate. The present invention is designed to meet such needs in the art.

SUMMARY OF THE INVENTION

The invention meets the above-mentioned needs in the art by storing historical data that makes it possible to compare an estimation of the bit-rate calculated using instantaneous values of SNR and congestion with data representative of the actual bit-rate experienced by the connected device. For example, the actual experienced bit-rate (available bandwidth) can be derived by many known classical methods that include passive measurement techniques such as using the measured packet transfer statistics from the operating system or network interface either instantaneously or taking a statistical average, or by using more advanced methods based on active measurement of the connection bit-rate by using known methods such as packet trains (such methods include, e.g. pathcar, pathrate, Pchar, Clink and Sproble software implementations, and more generally methods based on Variable Packet Size (VPS) probing, Packet Train Dispersion (PTD) probing, Self-Loading Periodic Streams (SLoPS), Pairing of the Packet Trains). Storing this data enables a comparison to be made and through this comparison to develop and use correction factor(s) that make the final estimation of bit-rate more accurate and robust.

In particular, the invention includes a method and corresponding apparatus of a wireless terminal used in determining the estimated achievable bit rate between a wireless terminal and one or more access points. The method includes the steps of statistically estimating an achievable bit rate between the wireless terminal and each access point to be checked for an estimated achievable bit rate based on a signal-to-noise (SNR) and/or signal-to-interference-noise (SINR) value of a signal received from each access point, and applying a correction factor to the statistically estimated achievable bit rate based on historical memory of previous achievable bit rate estimations and the accuracy of the previous achievable bit rate estimations during one or more previous connections of the wireless terminal to each access point. The statistical estimating step may optionally use congestion information of each the access point in estimating the achievable bit rate for each access point.

In an exemplary embodiment, the previous achievable bit rate estimations are stored in an access point history table with a MAC address identifying a corresponding access point. The entries in the access point history table may include at least one of (a) time stamp data identifying when a connection was established between the wireless terminal and an access point identified by a particular MAC address, (b) an average SNR and/or SINR experienced during the connection, and (c) an average physical modulation mode experienced during the connection. Each entry in the access point history table may also include an average relative achieved bit rate representing a ratio of an actual achieved bit rate against the data bit rate of offered data traffic. Since the method of the invention may be implemented in both the WLAN access points and wireless station clients, those skilled in the art will appreciate that the access point history tables may exist in the wireless stations and/or the WLAN access points.

The method of the invention may be implemented in the form of a software algorithm that is loaded into a processor to implement the bit rate estimation technique of the invention. On the other hand, the methods of the invention may be implemented using a wireless network card having a firmware algorithm loaded therein that implements the techniques of the invention.

The scope of the invention also includes computer readable media including software for calculating the estimated achievable bit rate of a wireless terminal to wireless access points. Such a computer readable media in accordance with the invention includes a first block of code that implements a bit rate estimation algorithm that statistically estimates an achievable bit rate between the wireless terminal and each access point to be checked for an estimated achievable bit rate based on a current signal-to-noise (SNR) and/or signal-to-interference-noise (SINR) value of a signal received from each the access point, a second block of code that manages an access point history memory to store and retrieve data representing previous achievable bit rate estimations and the accuracy of the previous achievable bit rate estimations during one or more previous connections of the wireless terminal to each the access point, and a third block of code that implements a throughput estimation algorithm that calculates and applies a correction factor to the statistically estimated achievable bit rate to a particular access point based on the values stored in the access point history memory for the particular access point.

Those skilled in the art will appreciate that the bit rate estimation technique of the invention is based on the assumption that certain information from a NIC (Network Interface Card) would be readily available for use by entities such as connection managers. This makes the link with the GOL-LUM project (http://www.ist-gollum.org) strong, since if the ULLA (Universal Link Layer API) were to become industry standard, the present invention could be easily exploited to build smart connection managers. Those skilled in the art will also appreciate that the techniques of the invention permit connection managers to recognize the best possible access point and to estimate the achievable bit-rate at that access point. This enables the wireless system to provide better services by optimizing use of scarce resources and to make the experienced-quality-of-connection better and more predictable. Other features and advantages of the invention may become apparent from the following detailed description of the invention and accompanying drawings.

BRIEF DESCRIPTION OF THE DRAWINGS

The foregoing summary, as well as the following detailed description of the invention, is better understood when read in conjunction with the appended drawings. For the purpose of illustrating the invention, there is shown in the drawings exemplary embodiments of various aspects of the invention; however, the invention is not limited to the specific methods and instrumentalities disclosed. In the drawings.

DETAILED DESCRIPTION OF ILLUSTRATIVE EMBODIMENTS

The subject matter of the present invention is described with specificity with respect to FIGS. 1-4 to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Overview

The invention is a simple method to statistically estimate the maximum available bit rate based on signal-to-noise (SNR) or SINR (signal-to-interference-noise) to the most optimal access point and an estimation of what is the most possible bit-rate that can be achieved after the actual connection is built. The invention is based on the general principle that one can estimate BER (Bit Error Rate) from SNR, roughly using known theoretical principles if the modulation is known. Moreover, if one has a better understanding of the radio environment (fading model) and radio equipment sensitivity itself, the estimation can be made even more accurate. In the simplest form of the invention, an experimental (theoretically based) model is used where each received SNR value is tabulated against the estimated BER in each wireless terminal. This BER value can be used to estimate the possible link-quality. If SNR is too low, then the BER is high and most probably the system could not work in a high modulation mode (e.g., 54 Mbps) but would have to switch to a lower modulation mode (e.g., 11 Mbps).

It is well known to those skilled in the art that the WiFi radio-links are asymmetric and that the clients actually use less power and typically have a worse antenna than the access points (APs) to which they are connected. Accordingly, using the received SNR from the AP is only a rough and optimistic estimation (a correction factor can be introduce to estimate the difference) of the received SNR on the AP. It is also possible that future 802.11k systems could provide better two-way estimations for SNR, for an access point can, in principle, beacon back to the client terminal the received SNR of the client terminal.

System Description

Figure 1:
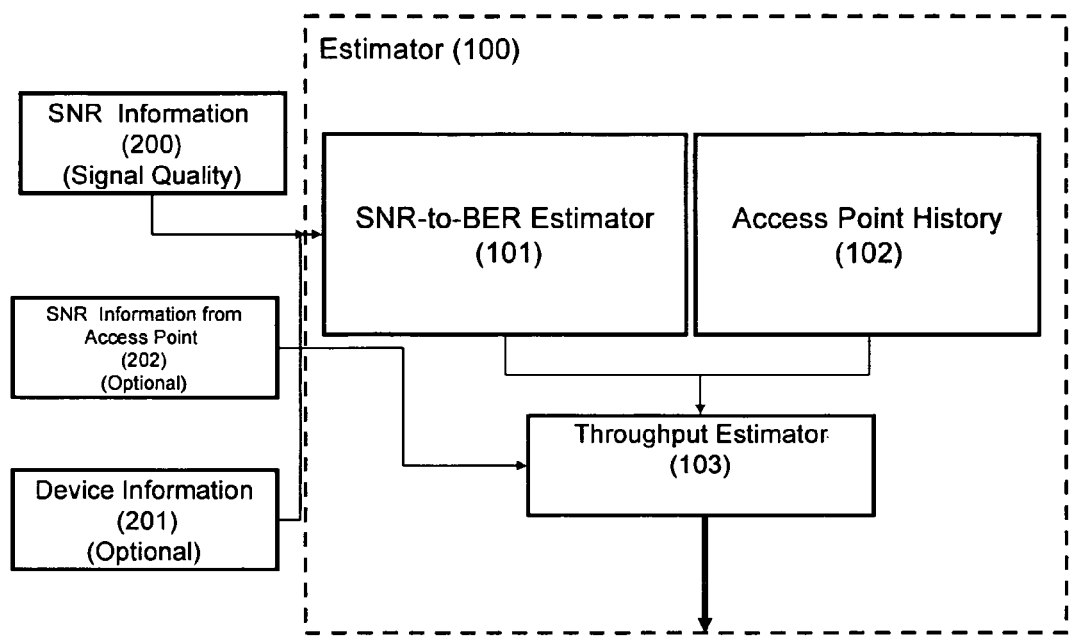
FIG. 1 illustrates an exemplary embodiment of the invention for using access point history data to improve the accuracy of the throughput estimation of an access point.

An exemplary embodiment of the throughput estimator (100) of the invention is illustrated in FIG. 1. As illustrated, the throughput estimator (100) includes a signal to noise (SNR) to bit error rate (BER) estimator (101) and a memory that stores access point history data (102) that together provide data to the throughput estimator (103) for calculating the throughput of the available access points using the techniques of the invention. Inputs to the throughput estimator (100) include SNR (signal quality) information (200) of the received signal from the access point and optional SNR (signal quality) information (202) from the access point reflecting the quality of the signal received by the access point from the wireless terminal including the throughput estimator (100). Other optional device information (201) may also be provided to the throughput estimator (100) in accordance with the invention.

The throughput estimator (100) of the invention implements a multi-phase estimation technique. In a first phase of the estimation in accordance with the invention, the reachable bit rate is estimated by using signal quality, and optionally congestion level information, to provide the bit rate estimation. This kind of "history blind" estimator can be implemented, for example, as described in related U.S. patent application Ser. No. 11/247,442 to the present inventors (the subject matter of that related application is hereby incorporated by reference in its entirety); however, the bit-rate estimator of the invention is not limited to the bit rate estimator described in that patent application. Rather, the key issue is that the first phase estimator uses the instantaneous signal quality as input to the throughput estimator (100) for processing. The minimal input for the first phase estimator is at least the SNR (or SINR or similar) level of received signal (200). This information might be a single number (in dBm), but most often can be treated as a vector, where each vector component gives the SNR value of each AP that is capable of providing a connection. Extra device information (201) may be available also, such as the explicit received sensitivity information as provided by the device manufacturer through a device driver or some other interface or information provided through some protocol that exchanges information between an access point (AP) and a wireless station (STA). As in the afore-mentioned related application, extra information on the congestion level at the network (for the access point under consideration) may also be available for the first level estimator.

In a second phase of the estimation in accordance with the invention, the first phase estimator output is corrected by using historical information relating the estimated bit rate values to the bit rates actually experienced. The actual experienced bit-rate (available bandwidth) can be derived by many known classical methods that include passive measurement techniques such as using the measured packet transfer statistics from the operating system or network interface either instantaneously or taking a statistical average, or by using more advanced methods based on active measurement of the connection bit-rate by using known methods such as packet trains (such methods include, e.g. pathcar, pathrate, Pchar, Clink and Sproble software implementations, and more generally methods based on Variable Packet Size (VPS) probing, Packet Train Dispersion (PTD) probing, Self-Loading Periodic Streams (SLoPS), Pairing of the Packet Trains). In the second phase of the estimation, a repository (102) stores known signal quality behavior of the access points so as to provide an Access Point History (APH). The APH can be implemented in an exemplary embodiment of the invention as a simple memory (database) entity (102) where a record is maintained on how accurate the previous bit-rate estimations turned out to be in practice based on a comparison of the estimated bandwidths with the actual bandwidths. The actual physical embodiment of APH memory is implemented using any adequate memory technology such as FLASH, local hard disk, and the like. The APH is an ordered list where Access Point ID (SSID) and MAC address are combined with the data in an experimentally known relation between the SNR and stable throughput. The invention thus provides the capability to make more calibrated estimations for those access points that are seen often enough by the system. The invention also provides the implicit capability to include a rough bias to throughput estimation by congestion level of the access point (not only PHY-layer information based estimator).

As shown in FIG. 1, output of the SNR-to-BER estimator (101) for the instantaneous signal quality and the access point history data (102) are combined in the actual throughput estimator algorithm (103) to provide a correction to the estimated value based on the historical accuracy of estimates and thus provide a conservative estimate on which PHY-layer option the system will switch to if it is to build an association (connection) to an access point. This PHY-layer estimation is used to report the probable bit-rate for the connection manager interface. Such a combination of the signal theory based estimate of the SNR-to-BER estimator (101) and the history based bias correction of the access point history data (102) provides a suitable measure to decide which access point in reality can reach the best bit-rate for user requirements.

In an exemplary implementation, the throughput estimator algorithm (103) implements a method that is a stepwise estimator with correctors. The primary estimator (101) will receive as minimum inputs from each recognized access point the following information:

a. SNR (estimation of received signal strength over noise and interference);

b. Possible supported bit-rates (PHY-layer modes) in each access point; and c. Estimation of the receiver sensitivity of the radio receiver in the receiving station.

Figure 2:
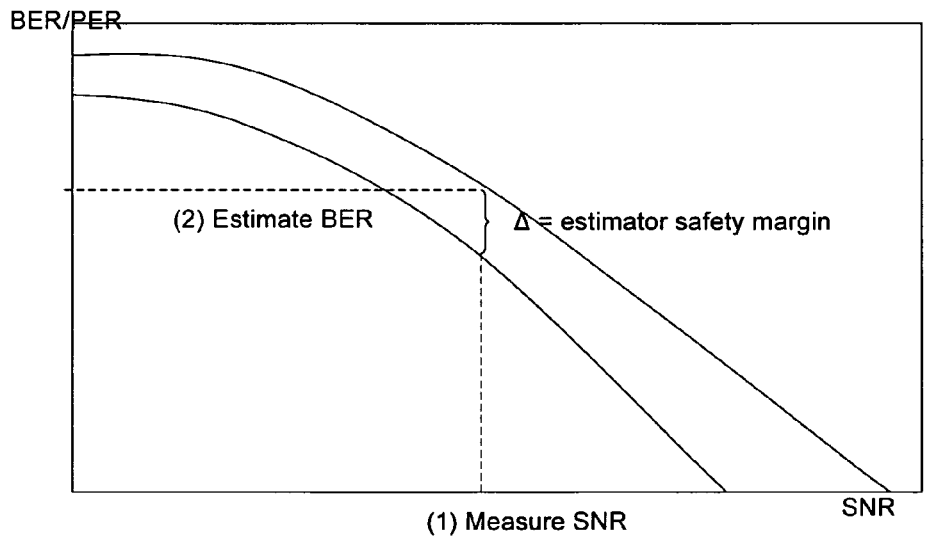
FIG. 2 illustrates the relationship between the measured signal-to-noise ration (SNR) to the estimate of bits per second for the bit error rate (BER) and/or the packet error rate (PER) of the access point.

The throughput estimator (103) makes a primary estimation by using a simple modulation theory to estimate the achievable BER from the SNR. An efficient, but not exclusive, implementation of the primary estimation would be to use tabulated conversion tables relating the SNR and BER as described in the afore-mentioned related patent application. A conservative correction parameter is applied to the stored values to take into account the implementation, antenna position, and other issues. The BER is used to estimate to which PHY-mode (and hence bit-rate) the system can actually switch to. This method also may take into account collision induced problems, as the competing stations will be participating to an interference level. The throughput estimator (103) can be built in such a way that proprietary competition is possible, hence the conversion table between SNR and BER does not need to be fixed, but could be device manufacturer specific and uploaded from a device driver, for example. FIG. 2 illustrates the relationship between the measured SNR and the corresponding estimated bits/s for the bit error rate (BER). As illustrated, the acceptable estimate may be within a defined range.

In the second phase, the primary estimation can be corrected by using Bayesian Inference (in order to find a confidence) and by using extra available device information (201) such as information on the sensitivity limit of the access point. This correction information can be introduced by adding a bias factor (correction term) to above primary estimator.

In a third phase of the method of the invention, the access estimation history is used to make a final correction to the estimated bit rate. In the third phase, the system keeps track of all the estimations it has done so far and calculates the estimation error for each estimation event it is processing. As a result, the system may provide a formal probabilistic estimation on how good the bit-rate prediction is by using Bayesian conditional probability and may use any known error estimator such as Kalman filters or Particle Filters to formally estimate the level of error bias, and correct the estimation accordingly.

In an exemplary implementation, there is a historical correction block ( ) that takes into account the historical performance of the throughput estimator with the known access points. The basic operation of the historical correction block ( ) is as follows:

(1) For each access point the wireless terminal will eventually associate with, an entry into its "history_table" is made. These history tables are enumerated (identified) by using the MAC_ADDRESS of each access point as a unique identifier. The IEEE 48-bit MAC address is desirable to use for this purpose as the MAC address is always available from access points.

(2) The history_table has a predetermined number of fields to keep historical values and to keep up a long term average value. The entry fields are reused in a ring-buffer (round-robin) fashion in order to keep only the list of last seen APs. A small table (less than 50 entries) is sufficient for this purpose since devices are usually used in the same locations.

(3) In an exemplary embodiment, each entry in the history_table will record the following information:
Time_stamp: when the association has been established;
Average SNR experienced during the association; and
"Average" physical mode established during the association.

The average bit-rate achieved during the connection is not calculated and recorded since this would be highly congestion dependent, which might be a highly varying issue with the access point. However, another field could be added to store the "average" relative achieved bit-rate that is calculated as a ratio of the achieved bit-rate against the offered traffic. For example, if the offered traffic is 2 Mbps, the physical mode is 11 Mbps, and 1 Mbps of traffic was achieved, then the average relative achieved bit rate is the achieved traffic (1 Mbps) over the offered traffic (2 Mbps) and equals 0.5.

(4) The historical entries are used to predict the accuracy of the current throughput estimator (103). The accuracy prediction algorithm itself can take several different forms, including the use of machine learning algorithms. The basic idea is always to get the current estimate (ESTIMATE_NOW) and input that into the accuracy estimator with the known previous values.

In accordance with the invention, the accuracy estimator uses different fields (e.g., fields (1)-(3) above) of the historical values to bias its estimation. For example, if all time-stamps (field (1)) are much older than the ESTIMATE_NOW, then historical estimators should have a lower confidence limit than in the case of very recent values ("environment might have changed"). In addition, if the average SNR samples (field (2)) are very similar to the SNR of the ESTIMATE_NOW, then that historical estimator should have a higher bias.

The accuracy estimator can output the statistically relevant confidence value (0%-100%) ranking how reliable the bit rate estimation has been. This confidence value could be used by different applications. The accuracy estimator then can make a recommendation on the right value (corrected estimation). As an example, the accuracy estimator might decide that it is highly probable that the ESTIMATE_NOW is wrong (all historical values with the same SNR have achieved a lower bit-rate than the ESTIMATE_NOW is proposing. Then, depending on the manufacturer set correction value, a biased value might be offer, for example, saying that the bit-rate could be:

corrected_estimation=(ESTIMATE_NOW+average (history))/2

While these examples are non-exclusive simple examples, it will be appreciated that more sophisticated machine-learning algorithms can be easily implemented as a part of the algorithm. For example, machine-learning algorithms include backpropagation or feed-forward neural networks.

Preferably, the historical values are held in an easy lookup table format with an access point identifier (MAC) and signal quality information that together provide the key information to use many different algorithms to correct bit-rate estimation. Thus, while a history based correction is described herein, those skilled in the art will appreciate that any of the following algorithms are representative, but not exclusive, examples:

a) "parameter mapping", where related historical SNR and congestion values that are as close as possible to the measured values are found and the historical bit-rate is used to bias the theoretical estimation;

(b) "AP average based", where one-to-one mapping is performed between (SNR, congestion) pairs and the average provided bit-rate from the access point to the client station is used to bias the estimation; and (c) "time corrected", where method (a) or (b) is used in accordance with the time of day in the matching measurements "now" versus historical measurements.

Those skilled in the art will appreciate that the throughput estimator may be implemented in (embedded) software within a wireless client device and that no special hardware is needed. The invention may also be implemented in a wireless network interface card as a firmware algorithm within the card. Other implementation arrangements will be apparent to those skilled in the art based on the description provided herein.

Exemplary Computer Environment

As is apparent from the above, all or portions of the various systems, methods, and aspects of the present invention may be embodied in hardware, software, or a combination of both. When embodied in software, the methods and apparatus of the present invention, or certain aspects or portions thereof, may be embodied in the form of program code (i.e., instructions). This program code may be stored on a computer-readable medium, such as a magnetic, electrical, or optical storage medium, including without limitation a floppy diskette, CD-ROM, CD-RW, DVD-ROM, DVD-RAM, magnetic tape, flash memory, hard disk drive, or any other machine-readable storage medium, wherein, when the program code is loaded into and executed by a machine, such as a computer or server, the machine becomes an apparatus for practicing the invention. A computer on which the program code executes will generally include a processor, a storage medium readable by the processor (including volatile and non-volatile memory and/or storage elements), at least one input device, and at least one output device. The program code may be implemented in a high level procedural or object oriented programming language. Alternatively, the program code can be implemented in an assembly or machine language. In any case, the language may be a compiled or interpreted language.

The present invention may also be embodied in the form of program code that is transmitted over some transmission medium, such as over electrical wiring or cabling, through fiber optics, over a network, including a local area network, a wide area network, the Internet or an intranet, or via any other form of transmission, wherein, when the program code is received and loaded into and executed by a machine, such as a computer, the machine becomes an apparatus for practicing the invention.

When implemented on a general-purpose processor, the program code may combine with the processor to provide a unique apparatus that operates analogously to specific logic circuits.

Moreover, the invention can be implemented in connection with any computer or other client or server device, which can be deployed as part of a computer network, or in a distributed computing environment. In this regard, the present invention pertains to any computer system or environment having any number of memory or storage units, and any number of applications and processes occurring across any number of storage units or volumes, which may be used in connection with processes for calculating the estimated achievable bit-rate and correcting same using access point historical data in accordance with the present invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services.

Distributed computing facilitates sharing of computer resources and services by exchange between computing devices and systems. These resources and services include, but are not limited to, the exchange of information, cache storage, and disk storage for files. Distributed computing takes advantage of network connectivity, allowing clients to leverage their collective power to benefit the entire enterprise. In this regard, a variety of devices may have applications, objects or resources that may implicate processing performed in connection with the estimation of the maximum achievable bit-rate of an access point using the methods of the present invention.

Figure 3:
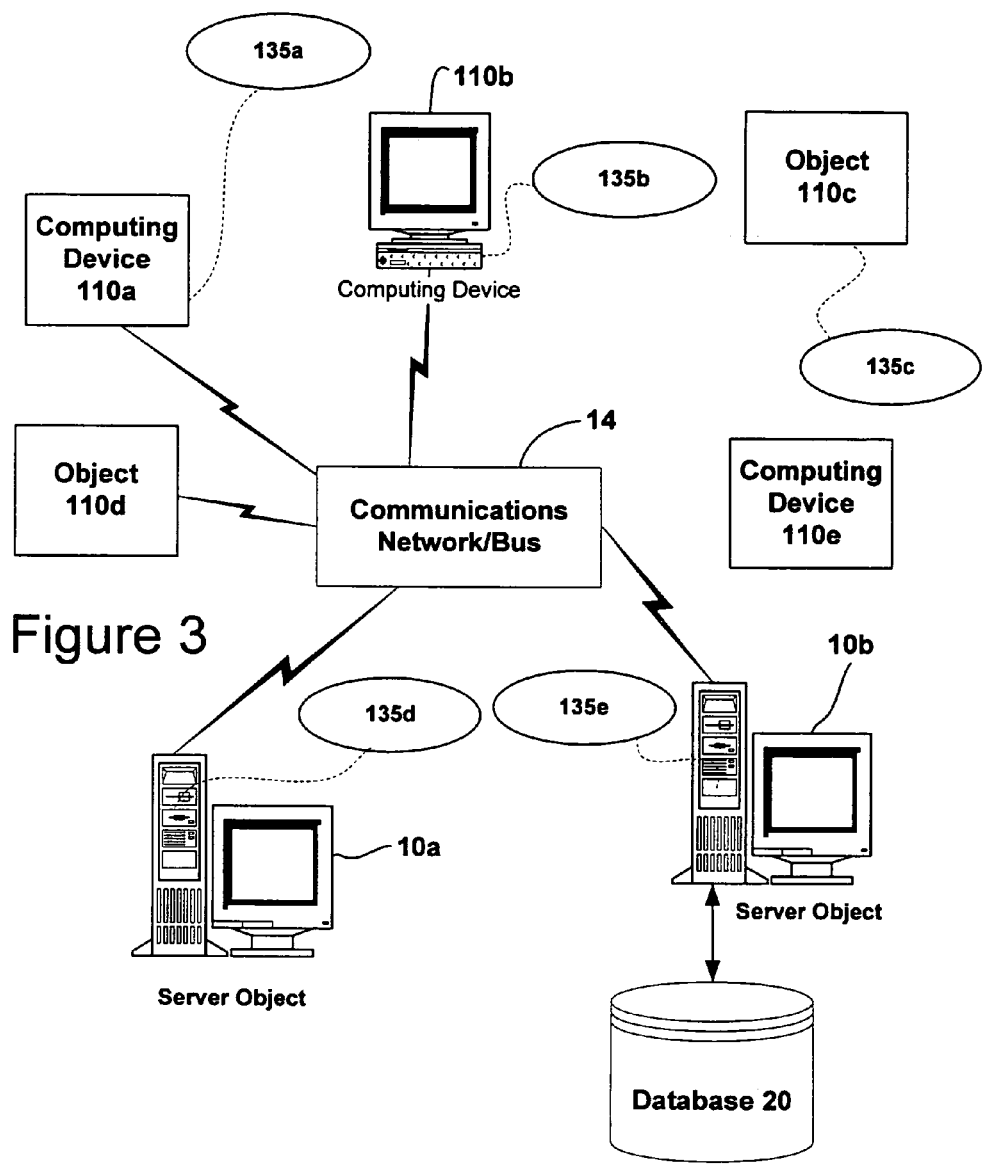
FIG. 3 is a block diagram representing an exemplary network environment having a variety of computing devices in which the present invention may be implemented.

FIG. 3 provides a schematic diagram of an exemplary networked or distributed computing environment that may be used in the implementation of the invention. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, televisions, MP3 players, personal computers, etc. Each object can communicate with another object by way of the communications network 14. This network may itself comprise other computing objects and computing devices that provide services to the system of FIG. 3, and may itself represent multiple interconnected networks. In accordance with an aspect of the invention, each object 10a, 10b, etc. or 110a, 110b, 110c, etc. may contain a bit-rate estimation application implementing the methods of the present invention.

It can also be appreciated that an object, such as 110c, may be hosted on another computing device 10a, 10b, etc. or 110a, 110b, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many of the networks are coupled to the Internet, which provides the infrastructure for widely distributed computing and encompasses many different networks. Any of the infrastructures may be used for exemplary wireless communications made incident to the present invention.

The Internet commonly refers to the collection of networks and gateways that utilize the TCP/IP suite of protocols, which are well-known in the art of computer networking. TCP/IP is an acronym for "Transmission Control Protocol/Internet Protocol." The Internet can be described as a system of geographically distributed remote computer networks interconnected by computers executing networking protocols that allow users to interact and share information over the network(s). Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 3, computers 110a, 110b, etc. can be thought of as clients and computer 10a, 10b, etc. can be thought of as servers, although any computer could be considered a client, a server, or both, depending on the circumstances. Any of these computing devices may process data in a manner that implicates the wireless access techniques of the invention.

A server is typically a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the persistence mechanism of the invention may be distributed across multiple computing devices.

Client(s) and server(s) may communicate with one another utilizing the functionality provided by a protocol layer. For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over any available communications medium.

Thus, FIG. 3 illustrates an exemplary networked or distributed environment, with a server in communication with client computers via a network/bus, in which the present invention may be employed for wireless access to a network. The network/bus 14 may be a LAN, WAN, intranet, the Internet, or some other network medium, with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to access a wireless access point.

In a network environment in which the communications network/bus 14 is the Internet, for example, the servers 10a, 10b, etc. can be servers with which the clients 110a, 110b, 110c, 110d, 110e, etc. communicate via any of a number of known protocols such as HTTP. Servers 10a, 10b, etc. may also serve as clients 110a, 110b, 110c, 110d, 110e, etc., as may be characteristic of a distributed computing environment.

In a conventional network configuration, communications may be wired or wireless, where appropriate. Client devices 110a, 110b, 110c, 110d, 110e, etc. may or may not communicate via communications network/bus 14, and may have independent communications associated therewith. For example, in the case of a TV or VCR, there may or may not be a networked aspect to the control thereof. Each client computer 110a, 110b, 110c, 110d, 110e, etc. and server computer 10a, 10b, etc. may be equipped with various application program modules or objects 135 and with connections or access to various types of storage elements or objects, across which files or data streams may be stored or to which portion(s) of files or data streams may be downloaded, transmitted or migrated. Any computer 10a, 10b, 110a, 110b, etc. may access a wireless access point using the techniques of the invention. Thus, the present invention can be utilized in a computer network environment having client computers 110a, 110b, etc. that can access and interact with a computer network/bus 14 and server computers 10a, 10b, etc. that may interact with client computers 110a, 110b, etc. and other like devices, and databases 20.

Exemplary Computer

Figure 4:
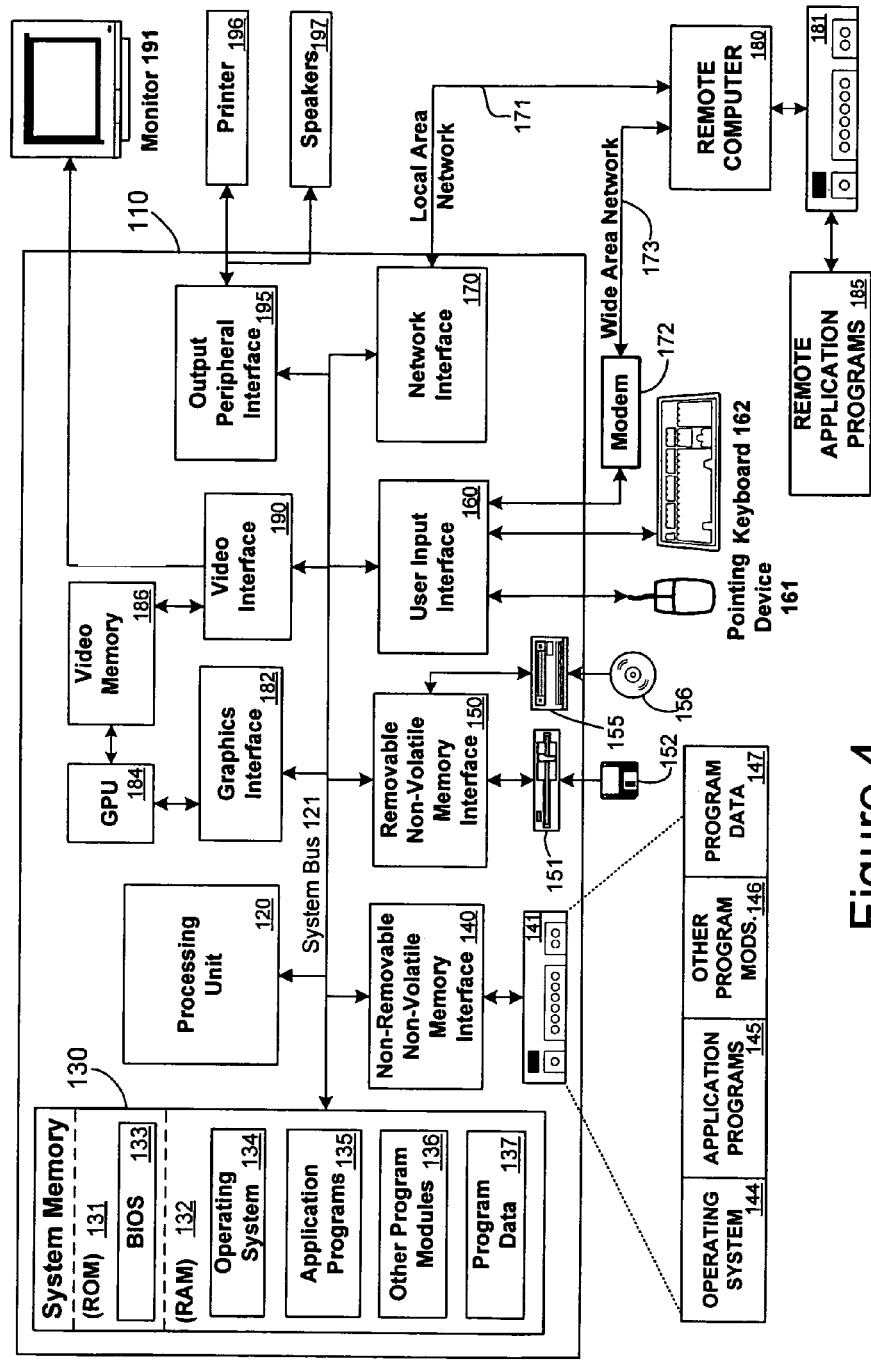
FIG. 4 is a block diagram representing an exemplary computing device in which the present invention may be implemented.

FIG. 4 and the following discussion are intended to provide a brief general description of a suitable computing device in connection with which the invention may be implemented. For example, any of the client and server computers or devices illustrated in FIG. 3 may take this form. It should be understood, however, that handheld, portable and other computing devices and computing objects of all kinds are contemplated for use in connection with the present invention, i.e., anywhere from which data may be generated, processed, received and/or transmitted wirelessly in a computing environment. While a general purpose computer is described below, this is but one example, and the present invention may be implemented with a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved or transmitted wirelessly to another computer is a desirable, or suitable, environment for operation of the wireless network access technique of the invention.

Although not required, the invention can be implemented via an operating system, and/or included within application or server software that operates in accordance with the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, the invention may be practiced with other computer system configurations and protocols. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like.

FIG. 4 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 4, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embody computer readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 4 illustrates operating system 134, application programs 135, other program modules 136, and program data 137.

The computer 110 may also include other removable/non-removable, volatile/nonvolatile computer storage media. By way of example only, FIG. 4 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-RW, DVD-RW or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 4 provide storage of computer readable instructions, data structures, program modules and other data for the computer 110. In FIG. 4, for example, hard disk drive 141 is illustrated as storing operating system 144, application programs 145, other program modules 146 and program data 147. Note that these components can either be the same as or different from operating system 134, application programs 135, other program modules 136 and program data 137. Operating system 144, application programs 145, other program modules 146 and program data 147 are given different numbers here to illustrate that, at a minimum, they are different copies. A user may enter commands and information into the computer 110 through input devices such as a keyboard 162 and pointing device 161, such as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182 may also be connected to the system bus 121. One or more graphics processing units (GPUs) 184 may communicate with graphics interface 182. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 4. The logical connections depicted in FIG. 4 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 4 illustrates remote application programs 185 as residing on memory device 181. It will be appreciated that the network connections shown are exemplary and other means of establishing a communications link between the computers may be used.

As the foregoing illustrates, the present invention is directed to a system and method for estimating the download bit-rate between a client station and an access point and adjusting the estimate based on historical data relating past bit-rate estimates to the actual bit-rates. It is also understood that changes may be made to the embodiments described above without departing from the broad inventive concepts thereof. For example, those skilled in the art will appreciate that the invention may be used with different IEEE 802.11 based networks (such as IEEE 802.11b/g and IEEE 802.11a) and enhance operations in, for example, 802.11k and 802.11s networks. Also, while the exemplary embodiment computes an estimate of the download bit rate (AP to STA), those skilled in the art will appreciate that the same algorithm could be used to compute the upload bandwidth (STA to AP). In such a case, the STA would need to receive the information about the SNR of the received signal on the AP. Also, the SNR received on the AP could be added to existing management frames in the form of a new information element. Moreover, those skilled in the art will appreciate that the calculations described herein could be performed continually using continually sampled SNR data. Accordingly, it is understood that the present invention is not limited to the particular embodiments disclosed, but is intended to cover all modifications that are within the spirit and scope of the invention as defined by the appended claims.

What is claimed:

1. A method of determining the estimated achievable bit rate between a wireless terminal and one or more access points, comprising:
    statistically estimating an achievable bit rate between said wireless terminal and each access point to be checked for the estimated achievable bit rate based on a signal-to-noise (SNR) and/or signal-to-interference-noise (SINR) value of a signal received from each said access point, wherein the achievable bit rate is estimated by said wireless terminal prior to building a connection between the wireless terminal and each access point; and
    applying a correction factor to the statistically estimated achievable bit rate based on historical memory of previous achievable bit rate estimations and an accuracy of said previous achievable bit rate estimations during one or more previous connections of said wireless terminal to each said access point wherein the accuracy is determined based on a comparison of each of the previous achievable bit rate estimations and a corresponding previous actually achieved bit rate.

2. The method of claim 1, wherein the statistical estimating step further comprises the step of using congestion information of each said access point in estimating said achievable bit rate for each said access point.

3. The method of claim 1, wherein the previous achievable bit rate estimations are stored in an access point history table with a MAC address identifying a corresponding access point.

4. The method of claim 3, comprising the step of storing in each entry in said access point history table an average SNR and/or SINR experienced during a corresponding previous connection,.

5. The method of claim 4, comprising the further step of storing in each entry in said access point history table an average relative achieved bit rate representing a ratio of an actual achieved bit rate against the data bit rate of offered data traffic.

6. A wireless terminal having a wireless throughput estimator that determines the estimated achievable bit rate available from one or more access points, comprising:
- a bit rate estimator that statistically estimates the achievable bit rate between said wireless terminal and each access point to be checked for an estimated achievable bit rate based on a current signal-to-noise (SNR) and/or signal-to-interference-noise (SINR) value of a signal received from each said access point, wherein the achievable bit rate is estimated prior to building a connection between the wireless terminal and each access point;
- an access point history memory that stores previous achievable bit rate estimations and an accuracy of said previous achievable bit rate estimations during one or more previous connections of said wireless terminal to each said access point wherein the accuracy is determined based on a comparison of each of the previous achievable bit rate estimations and a corresponding previous actually experienced bit rate; and
- a processor programmed to implement a throughput estimation algorithm that calculates and applies a correction factor to the statistically estimated achievable bit rate to a particular access point based on the values stored in said access point history memory for said particular access point.

7. The wireless terminal of claim 6, wherein the bit rate estimator receives congestion information from said particular access point and uses the received congestion information to estimate said achievable bit rate for said particular access point.

8. The wireless terminal of claim 6, wherein the access point history memory stores previous achievable bit rate estimations with a MAC address identifying a corresponding access point.

9. The wireless terminal of claim 6, wherein the access point history memory an average SNR and/or SINR experienced during a corresponding previous connection.

10. The wireless terminal of claim 9, wherein each entry in said access point history table includes an average relative achieved bit rate representing a ratio of an actual achieved bit rate against the data bit rate of offered data traffic.

11. The wireless terminal of claim 8, wherein the access point history memory stores said previous achievable bit rate estimations and MAC addresses for a predetermined number of most recent connections made by the wireless terminal to an access point.

12. The wireless terminal of claim 6, wherein the processor calculates the correction factor using backpropagation or feed-forward neural networks.

13. The wireless terminal of claim 6, wherein the throughput estimation algorithm comprises a parameter mapping algorithm that uses historical bit rate data to bias the statistically estimated achievable bit rate, an access point average algorithm that uses an average bit rate provided by an access point to bias the statistically estimated achievable bit rate, and/or a time corrected algorithm that uses time of day data to determine whether to use contemporaneous or historical data.

14. The wireless terminal of claim 6, farther comprising a memory that stores a software algorithm that is loaded into said processor to implement said throughput estimation algorithm.

15. The wireless terminal of claim 6, further comprising a wireless network card having a firmware algorithm loaded therein that implements said throughput estimation algorithm and provides the statistically estimated achievable bit rate, corrected by the correction factor, to said processor.

16. The wireless terminal of claim 15, wherein the processor modifies the statistically estimated achievable bit rate for each access point by a bandwidth correction factor calculated from congestion information from the access point.

17. A computer readable medium storing software for calculating the estimated achievable bit rate of a wireless terminal to wireless access points, comprising:
- a first block of code that implements a bit rate estimation algorithm that statistically estimates the achievable bit rate between said wireless terminal and each access point to be checked for an estimated achievable bit rate based on a current signal-to-noise (SNR) and/or signal-to-interference-noise (SINR) value of a signal received from each said access point, wherein the achievable bit rate is estimated prior to building a connection between the wireless terminal and each access point; and
- a second block of code that manages an access point history memory to store and retrieve data representing previous achievable bit rate estimations and an accuracy of said previous achievable bit rate estimations during one or more previous connections of said wireless terminal to each said access point wherein the accuracy is determined based on a comparison of each of the previous achievable bit rate estimations and a corresponding previous actually experienced bit rate; and
- a third block of code that implements a throughput estimation algorithm that calculates and applies a correction factor to the statistically estimated achievable bit rate to a particular access point based on the values stored in said access point history memory for said particular access point.

18. The method of claim 3, comprising the step of storing in each entry in said access point history table at least one of a time stamp data identifying when a corresponding previous connection was established between said wireless terminal and an access point identified by a particular MAC address, and an average physical modulation mode experienced during the corresponding previous connection.

19. The wireless terminal of claim 6, wherein the access point history memory stores in each entry at least one of a time stamp data identifying when a corresponding previous connection was established between said wireless terminal and an access point identified by a particular MAC address, and average physical modulation mode experienced during the corresponding previous connection.

* * * * *